(12) United States Patent
Mundarath et al.

(10) Patent No.: US 11,646,783 B2
(45) Date of Patent: *May 9, 2023

(54) OPTIMAL BEAMFORMING IN MILLIMETER-WAVE CELLULAR NETWORKS USING A SINGLE COMPOSITE RANDOM ACCESS PREAMBLE

(71) Applicant: NXP USA, Inc., Austin, TX (US)

(72) Inventors: Jayakrishnan C. Mundarath, Austin, TX (US); Jayesh H. Kotecha, Austin, TX (US)

(73) Assignee: NXP USA, Inc., Austin, TX (US)

( * ) Notice: Subject to any disclaimer, the term of this patent is extended or adjusted under 35 U.S.C. 154(b) by 768 days.

This patent is subject to a terminal disclaimer.

(21) Appl. No.: 16/139,691

(22) Filed: Sep. 24, 2018

(65) Prior Publication Data
US 2020/0099439 A1 Mar. 26, 2020

(51) Int. Cl.
| | |
|---|---|
| *H04B 7/08* | (2006.01) |
| *H04W 16/28* | (2009.01) |
| *H04B 17/318* | (2015.01) |
| *H04W 74/08* | (2009.01) |

(52) U.S. Cl.
CPC .......... *H04B 7/088* (2013.01); *H04B 17/318* (2015.01); *H04W 16/28* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2014/0126620 A1 | 5/2014 | Maltsev et al. | |
| 2014/0177607 A1* | 6/2014 | Li | H04W 52/42 370/336 |
| 2016/0119038 A1* | 4/2016 | Thomas | H04B 7/088 370/329 |
| 2018/0027594 A1 | 1/2018 | Nagaraja et al. | |
| 2018/0092129 A1* | 3/2018 | Guo | H04W 56/0045 |
| 2018/0248604 A1* | 8/2018 | Zhang | H04B 7/08 |
| 2018/0368189 A1* | 12/2018 | Narasimha | H04W 56/001 |
| 2019/0281607 A1* | 9/2019 | Gao | H04L 5/005 |

(Continued)

OTHER PUBLICATIONS

3GPP, Physical channels and modulation, 3rd Generation Partnership Project, Technical Specification Group Radio Access Network, TS 38.211 V15.1.0, NR (Release 15), Mar. 2018.

(Continued)

*Primary Examiner* — Mohammad S Adhami (57) ABSTRACT

A millimeter-wave wireless multiple antenna system (80) and method (100) are provided in which a UE (120) uses a multi-antenna subsystem (81) to identify a plurality of m strongest transmit beams (122) from the base station (110) based on power measurements of a plurality of synchronization signal blocks (SSBs) transmitted on a corresponding plurality of transmit beams by the base station (110), and to generate a composite uplink random access channel (RACH) preamble (123) that is sent (124) to the base station (110) to identify the plurality of m strongest transmit beams and relative weights for each of the plurality of m strongest transmit beams which are used by the base station (112) to generate an optimal downlink transmit beam for use in sending a RACH response to the UE (120).

22 Claims, 7 Drawing Sheets

(56) References Cited

U.S. PATENT DOCUMENTS

| | | | |
|---|---|---|---|
| 2019/0289640 A1* | 9/2019 | Kim | H04B 7/0695 |
| 2019/0364603 A1* | 11/2019 | Qian | H04W 74/0833 |
| 2020/0100290 A1* | 3/2020 | Mundarath | H04W 16/28 |

OTHER PUBLICATIONS

Marco Giordani et al., Multi-Connectivity in 5G mmWave Cellular Networks, Apr. 30, 2016.

Marco Giordani et al., Initial Access in 5G mmWave Cellular Networks, 5G Radio Access Network Architecture and Technologies, IEEE Communications Magazine, Nov. 2016.

* cited by examiner

OPTIMAL BEAMFORMING IN MILLIMETER-WAVE CELLULAR NETWORKS USING A SINGLE COMPOSITE RANDOM ACCESS PREAMBLE

BACKGROUND OF THE INVENTION

Field of the Invention

The present invention is directed in general to field of information processing. In one aspect, the present invention relates to an apparatus, system and method for initial cell acquisition process or post-connected process in next generation millimeter-wave cellular communication systems.

Description of the Related Art

Wireless communication systems transmit and receive signals within a designated electromagnetic frequency spectrum, but the capacity of the electromagnetic frequency spectrum is limited. As the demand for wireless communication systems continues to expand, there are technical challenges to increasing throughput in wireless communication links. With next-generation wireless systems, such as the 5G wireless network technologies being deployed in 2018 and later, millimeter-wave (mm-wave) data transmission has emerged as a highly promising approach to achieving gigabit/s throughput in wireless communications links by offering orders of magnitude more spectrum than the congested bands in conventional UHF and microwave frequencies below 3 GHz. However, with extremely high carrier frequencies, mm-wave signals experience poor propagation and high path-loss. To overcome the large isotropic path loss, mm-wave signal schemes rely heavily on highly directional transmissions. With advances in CMOS RF circuits which enable large numbers of electrically steerable antenna elements, beamforming can be used to achieve cell coverage by directionally transmitting and receiving mm-wave communications. However, the use of directional transmissions significantly complicates the requirement of initial access—the procedure by which a mobile (or user equipment (UE) in 3GPP terminology) discovers a potential cell and establishes a link-layer connection with the corresponding base station (BS). In addition to the mutual detection of the BS and the UE, the initial access procedure in mm-wave cells must provide a mechanism by which both the UE and the BS can determine suitable beamforming directions on which subsequent directional communication can be carried out. Directional beamforming transmissions typically have a tradeoff between coverage range and beamwidth/number of transmission beams, because using narrower beams to realize very high beamforming gains requires a larger number of beam directions, which slows down the initial access process due to a larger angular search. This increase in delay goes against one of the main objectives of mm-wave systems, which is to dramatically reduce both data plane and control plane latency.

While there are various mm-wave initial access design proposals for establishing initial beamforming directions between the UE and the BS, they typically use signaling for synchronization and beam searching/finding purposes, referred to herein as a synchronization signal block (SSB), that is periodically transmitted by the base station (gNB) using a defined set of directional transmit beams on the downlink which are not necessarily aligned with the exact UE location. On the receive side, this location uncertainty during initial acquisition presents design challenges with providing a robust cell search/acquisition strategy/procedure since existing solutions must account for location uncertainty effects when balancing the acquisition time (latency constraint) against the acquisition probability (coverage constraint). For example, increases in acquisition probability (and thus, coverage) are typically achieved by using the sharpest transmit beams that are aligned with the actual UE location, which in turn proportionally scales up the number of transmit beams to search over, thereby increasing the acquisition time. With a brute force solution of searching over all of the defined set of directional transmit beams, the best coverage is achieved for that set of beams, but at the expense of a maximum worst case (and average) latencies. These worst case latencies are also linearly proportional to the number of transmission beams used by the base station. And while latency can be reduced by compacting the search space to search over wider (but fewer) beams, this will result in reduced coverage since the selection of one of a finite set of beams for "directional" DL and UL transmissions is not likely to reflect the exact UE direction/location, thereby rendering the beam for the UE is suboptimal (not centered) during the initial access procedure. As seen from the foregoing, the existing initial access solutions for mm-wave systems are extremely difficult at a practical level by virtue of the challenges with performing fast and robust cell searches for 5G and mm-wave wireless communication systems, especially as the number of transmit and receive beams increase with next-generation wireless systems, increasing directional initial access tradeoffs between delay performance and coverage.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for accurately and efficiently using one or more random access channel (RACH) preambles to signal a plurality of best or "closest" downlink transmit beams towards the UE and transmitting the one or more RACH preambles during their respective transmission opportunities, thereby enabling the base station to generate an optimal beamformer using the signaled plurality of best or "closest" downlink transmit beams. As disclosed herein, the disclosed RACH preamble signaling scheme for identifying multiple best or "closest" downlink transmit beams with one or more RACH preambles can be used whenever beamforming directions need to be established between the UE and BS. For example, one the RACH preamble signaling scheme can be used during an initial access phase of a cell search and/or in beam failure recovery phase for next generation mm-wave cellular systems, such as the 5G New Radio (5G-NR) Rel 15 specifications and even beyond 3GPP mm-wave communication standards.

In selected embodiments, an apparatus, method, and system for enabling optimal beamforming using a RACH procedure are disclosed for achieving maximum robustness (coverage) by having each user equipment (UE) generate and transmit one or more RACH preambles which signals multiple TX beams towards the UE so that the base station can accurately calculate the optimal transmit beam(s) which is not limited to the finite or defined set of directional transmit beams on the downlink. In a first step, the base station periodically transmits signal acquisition synchronization signal blocks (SSB) on a defined set of time-multiplexed, directional transmit beams (directions) on the downlink (DL). At each user equipment (UE) device, the DL receive (RX) beams are scanned to identify a plurality of "m" best or closest beams/beam directions based on measurements on the SSB transmissions, and one or more RACH preambles (e.g., a single composite RACH preamble) are designed to convey the "m" favorable DL TX beams (e.g., m=2) to the base station along with the relative weights for each of the identified "m" beams. Using each UE's received RACH preamble(s), the base station deduces the "m" communicated DL TX beam directions $\theta_{k=1:m}$ and their corresponding weights $w_{k=1:m}$ for each UE, and calculates therefrom the optimal beam "direction" $\theta_{opt}$ as a weighted sum. In the final step, the base station uses the beamforming weights corresponding to $\theta_{opt}$ to transmit to the UE with either a single-beam or multi-beam DL transmission system. In selected embodiments, for uplink transmission on the RACH opportunity corresponding to one of the "m" favorable DL TX beams (e.g., the "strongest" DL TX beam), the UE is configured to design a single composite RACH preamble (SCRP) as a linear weighted superposition of sequences with IDs derived from a subset of IDs reserved for "multiple RACH," with each sequence in the superposition being weighted proportionally to the relative power received for the corresponding DL TX beams. Upon reception of a single composite RACH preamble (within a RACH opportunity mapping to an SSB beam index, j), that contains a linear superposition of message sequences with IDs belonging to the set, $\tilde{S}$, identification of any ID within this set enables the base station to ascertain all IDs contained in $\tilde{S}$, and, to determine a unique TX beam index for each ID contained in $\tilde{S}$.

As will be appreciated by those skilled in the art, the above-described approach can readily be generalized for any suitable RACH preamble which uniquely conveys, for each UE, a plurality of m>1 "best" transmit beam directions and their corresponding weights corresponding to the relative power received for the corresponding DL TX beams using the SSBs obtained either in the initial synchronization process or subsequently. In selected embodiments, the single composite RACH preamble may correspond to a single RACH preamble that corresponds to m>1 TX beams, i.e. the transmission of this preamble conveys the selection of a unique or predetermined set of m TX beams. With an example base station having 64 total DL TX beams, 32 preambles in the set of preambles could each map to 2 of the 64 beams, thereby providing a composite signaling of m=2 TX beams. In selected embodiments, the m signaled TX beams may be directionally adjacent to one another.

Figure 1:
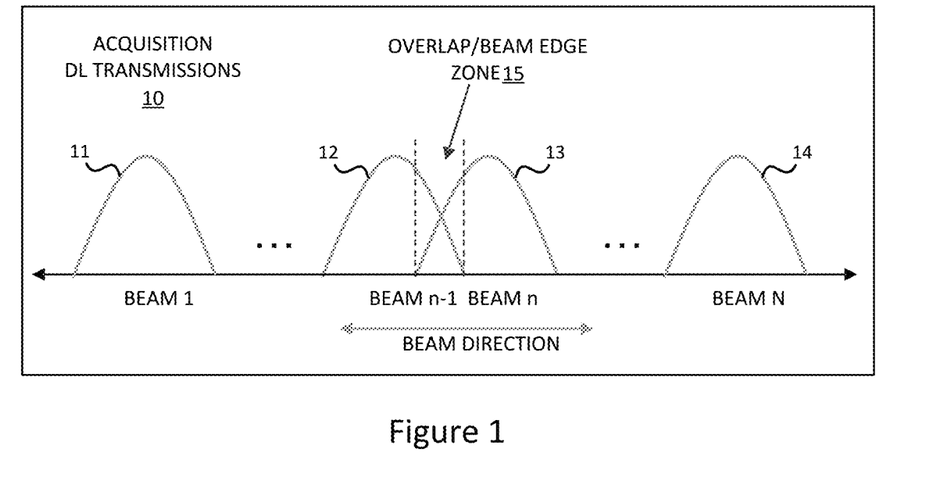
FIG. 1 diagrammatically depicts a plurality of acquisition downlink transmit beams used by a base station (BS) in a wireless communication system synchronization procedure.

To provide additional details for an improved contextual understanding of the present disclosure, reference is now made to FIG. 1 which diagrammatically depicts a plurality of acquisition downlink transmit beams 1-N 10 used by a base station (BS) in a wireless communication system synchronization procedure. As will be appreciated, the wireless communication system includes a base station (BS) and one or more user equipment (UE) devices, each equipped, respectively, with transmit/receive multi-antenna array systems which are configured to transmit and/or receive directionally using the directional beams. In a given geographic area, the base station may include one or more transmitters to communicate with one or more receivers at each UE device, with the base station using beamforming techniques to transmit one or more data streams through the transmit multi-antenna array system, and the receiver combines the received signal stream(s) from the receive multi-antenna array system to reconstruct the transmitted data. At the transmit station, this is accomplished with "beamforming" weights whereby each data signal $s_i$ is processed by a digital signal processor and analog/digital beamformer for transmission by applying a weight vector $w_i$ to the signal $s_i$ and transmitting the result $x_i$ over the transmit antenna array. The weighting vector $w_i$ is used to directionalize the signal with the objective of enhancing the signal quality or performance metric, like signal-to-interference-and-noise ratio (SINR) of the received signal at the receiver station. At the receiver station, the received signals detected at the receive antenna array are processed using a combining vector $v_i$ that is applied by the analog beamformer units (AB) and digital signal processor (DP). In an example embodiment where the transmit station has an array of N transmit antennas, the digital signal processor and analog beamformer prepare a transmission signal, represented by the vector $x_i$, for each signal $s_i$. The transmission signal vector $x_i$ is determined in accordance with equation $x_i=w_i \cdot s_i$, where $w_i$ is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna.

At the receiver station, the transmitted signals are received on the $k_i$ receive antennas in the receive antenna array. For example, the transmission signal vector $x_1$ is transmitted via a channel represented by a channel matrix $H_i$, and is received at the receiver station as a receive signal vector $y_1=H_1^H x_1+n_1$, where $n_1$ represents noise and any co-channel interference caused by other subscriber stations, and "$H_1^H$" represents the complex conjugate transpose of the channel matrix correlating the transmit station and the receiver station. The superscript "H" is used herein as a hermitian operator to represent a complex conjugate transpose operator. The $j^{th}$ element of the received signal vector $y_1$ represents the signal received on the $j^{th}$ antenna of receiver station 110, $j \in \{1, 2, \ldots, k_i\}$. To obtain a data signal, $z_1$, which is an estimate of the transmitted data $s_i$, the digital signal processor (DP) and analog beamformer (AB) at the receiver station combine the signals received on the $k_i$ antennas of the array using a combining vector $v_i$ in accordance with the equation, $z_1=y_1^H v_1$.

With emerging 5G wireless communications, massive MIMO techniques are proposed for using transmit/receive multi-antenna array systems which include arrays of elements driven by individual signals to create multiple signal beams over multiple paths. At the location of the receiver station, signals from all these paths may be added constructively to enable a high data rate by using multichannel phase shifting techniques to combine the signals from the multiple paths. In selected analog antenna embodiments, multichannel phase shifting can be done in the analog domain, by taking the transmit data stream, dividing it as many ways as there are elements in the antenna array, and then applying phase shifting to each of them. But due to the inflexibility of such analog systems which can only handle one data stream and generate therefrom one signal beam, another digital antenna approach provides each element of the antenna array with its own transceiver and set of data converters, thereby providing the ability to handle multiple data streams and generate multiple beams from one array.

With the increasing reliance on directional transmit and receive beamforming techniques for overcoming high isotropic path loss with next generation mm-wave cellular communication systems, such as 5G-NR, there are associated control and setup challenges for such systems. For example, initial access procedures can be significantly delayed due to the need for the BS and the UE to find the initial directions of transmission. With typical cell acquisition techniques where the UE relies on a synchronization signal block (SSB) to acquire initial access, the base station (gNB) will transmit, periodically or aperiodically, the SSB on each beamformed TX beam, thereby forming an SSB burst which has a specified SSB duration (specifying the total time for transmitting SSBs spanning the entirety of all supported TX beams/directions) and a specified SSB period (specifying the periodic repetition rate between SSB bursts). For example, an SSB burst may include SSB transmissions that are sent on 64 TX beams (e.g., SSB 1-SSB 64), with each SSB using a different beam and specifying a RACH opportunity for a UE to send a RACH request.

With conventional synchronization protocols, the UE can listen for an SSB transmission on one its configurable RX beams by tuning its antenna array system to listen for an SSB burst on each RX beam. In particular, the UE does an initial cell search to decode broadcast messages to get time and frequency synchronization and essential identifying information (MIB, SIBs, etc.) for a RACH uplink opportunity with the base station. The UE and BS can then engage in a "random access channel" (RACH) procedure where the UE announces its presence over a synchronized uplink message, such as by transmitting a preamble sequence on a RACH on the uplink (UL) which is implicitly or explicitly mapped to a specific downlink (DL) transmit beam. Upon receiving a UE's RACH, the BS assigns an identification to the UE and associated downlink transmit beam. Upon exchanging one or more DL and UL messages on the identified beams, the BS and UE establish a connected state (e.g., RRC_connected). Once RRC connected, several configuration messages are exchanged by the higher layers which enable the UE to receive and transmit dedicated "data" transmissions.

As will be appreciated, there are design challenges for providing a robust cell search/acquisition strategy/procedure which minimizes the initial acquisition time (latency constraint) while maximizing the acquisition probability (coverage constraint). While some initial access solutions propose to reduce the latency by compacting the search space at the UE to search over wider (but fewer) beams, this approach will reduce the coverage without minimizing acquisition latency. Conversely, the acquisition probability (coverage constraint) can be increased by using the sharpest beams possible, but this comes at the expense of acquisition time (latency constraint) when there are more beams to be processed. This latency challenge is made even more difficult as the number of TX/RX beams increases, thereby increasing the acquisition time required to search over all beams. It is recognized that, even when there are more and sharper beams, there remain design challenges for providing a robust cell search/acquisition strategy/procedure since the beams will not be exactly aligned with every possible UE location.

Figure 2:
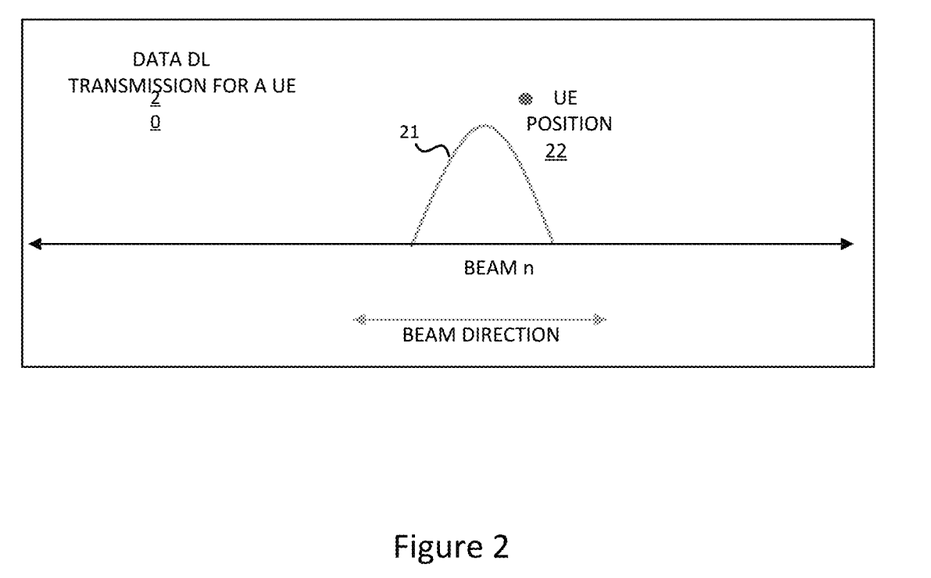
FIG. 2 diagrammatically depicts a data downlink transmit beam selected by a wireless communication system for synchronization between a base station (BS) and suboptimally-aligned user equipment (UE).

To illustrate this challenge, reference is now made to the plurality of acquisition downlink transmit beams 11-14 which are used by a base station during initial acquisition for downlink transmission of the SSBs 1-N. In the example, Beam 1 11 is used for a first SSB at one end of the beam rotation direction, and successive beams 2-N are used for the remaining SSBs, with beam n-1 12 being use for SSB n-1, beam n 13 being use for SSB n, and so on, with beam n 14 being use for SSB N. With current wireless mm-wave wireless communication systems (such as latest 5G-NR Rel 15 specifications), the TX beams used by the base station typically have overlapping patterns 11-14, as shown in FIG. 1. However, such systems are conventionally constrained to select only one of the beams 11-14 for making DL TX transmissions. As a result, the optimal DL TX beam direction from the base station to a UE device will not occur unless the beam center aligns to the UE's direction. This window of non-alignment can be seen in FIG. 1 with the overlap or beam edge zone 15 where any UE is not located in the beam center but is instead on the "beam edge" of (two) TX beams such that the signal strength from either beam is poorer relative to the UE's in the central part of the beam. As shown in FIG. 2 with the diagrammatic depiction 20 of a data downlink transmission for a UE located at position 22, the beam n 21 selected for synchronization by the base station (BS) is suboptimally aligned with the user equipment (UE) location 22. This has the dual effect of lower coverage (at least for the beam edge UEs) and non-uniform coverage across beams. Both these effects can be mitigated with wider beams, but wider beams have the undesirable effect of reducing range. Thus, to optimize the range-coverage tradeoff, it is desirable to have techniques to improve signal strength of transmissions to these UEs which are on the beam edges during acquisition without reducing range and thereby reduce non-uniformity of coverage. Without beam optimization to increase signal strength at the UE, performance of beam edge users will suffer thereby reducing reliability of the RACH procedure itself. Alternatively, in a hierarchical method, wider beams are used initially and then beam refinement is done using sharper beams. To balance synchronization time and range, conventional BS operations will use a set of wider beams initially to broadcast the SSBs, and once the connection is established via the RACH procedure using multiple back and forth messages as outlined earlier, the BS uses further dedicated beacons and feedback to determine a refined beam direction for the specific UE and subsequently to use a sharper beam for subsequent data transmissions to and from the UE. As will be appreciated, the limitations to this conventional approach include requiring additional beam refinement messages for determining an optimal beam that results in larger acquisition latencies, and the entire RACH procedure is done based on the coarse suboptimal beam directions from the initial SSB transmissions. Thus, a key challenge is to optimize the beamforming "early," that is, during the RACH procedure itself, and without the need for further "beam refinement" procedures that result in increased acquisition latencies and communication overheads.

Figure 3:
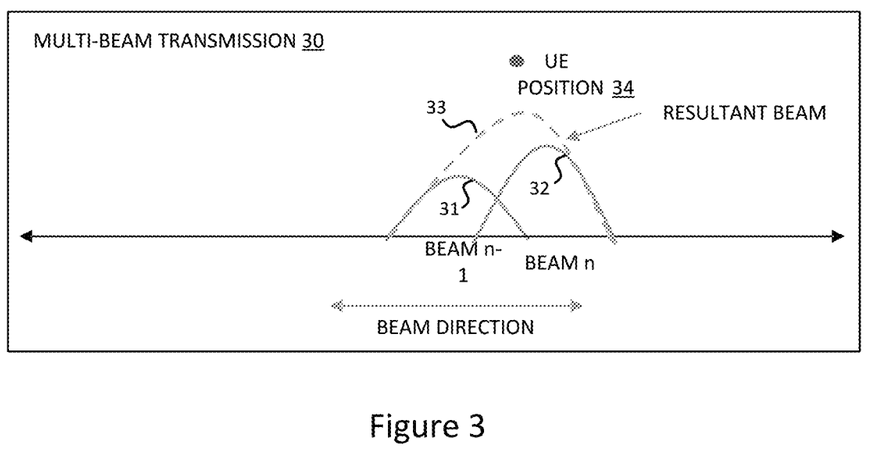
FIG. 3 diagrammatically depicts a plurality of data downlink transmit beams which are effectively combined into a resultant downlink transmit beam for synchronization of a wireless communication system in accordance with selected embodiments of the present disclosure.

To address these design challenges and other limitations from conventional approaches for making initial acquisition, reference is now made to FIG. 3 which diagrammatically depicts a multi-beam transmission scheme 30 for generating a plurality of data downlink transmit beams 31, 32 which are effectively combined into a resultant downlink transmit beam 33 which is aligned with the UE position 34 for synchronization of a wireless communication system in accordance with selected embodiments of the present disclosure. By transmitting two or more DL TX beams 31, 32 which are scaled and weighted to control the direction of the resultant beam 33 for optimal alignment with the UE location 34, the signal strength of the resultant beam 34 to the UE position 34 is effectively increased as compared to either of the constituent beams 31, 32, thereby enhancing link quality.

Figure 4:
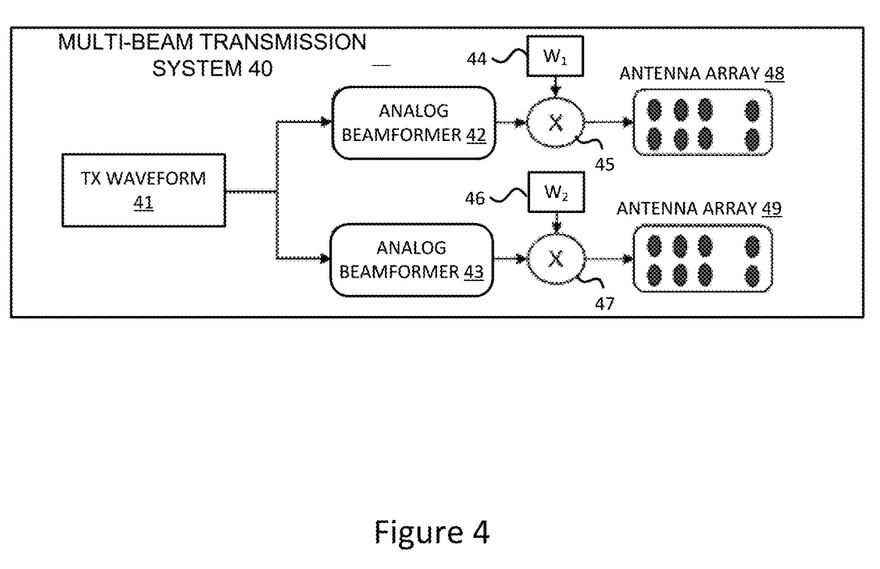
FIG. 4 depicts a wireless communication system which uses a multi-beam transmission system to perform synchronization procedure between a base station (BS) and user equipment (UE) in accordance with selected embodiments of the present disclosure.

While any suitable multi-beam transmission system may be used, reference is now made to FIG. 4 which depicts an example wireless communication system 40 for performing optimal beamformed transmission between a base station (BS) and user equipment (UE) in accordance with selected embodiments of the present disclosure. As disclosed, the wireless communication system 40 is equipped with one or more transmit waveform units 41 (e.g., digital signal processors) and a plurality of analog beamformer units 42, 43, each including a corresponding power weighting control circuit 44-45, 46-47 and transmit antenna array 48, 49. In particular, the first beam 31 (e.g., beam n-1) is generated by the first analog beamformer 42 and then applied to the power modulator circuit 45 which applies power weighting values 44 $W_1$ to modulate its transmit power in relation to the received power at the UE. In addition, the second beam 32 (e.g., beam n) is generated by the second analog beamformer 43 and then applied to the power modulator circuit 47 which applies power weighting values 46 $W_2$ to modulate its transmit power in relation to the received power at the UE. In this configuration, the beamformer units 42, 43 are used to generate a plurality of power modulated data downlink transmit beams 31, 32 which are effectively combined into a resultant downlink transmit beam 33 that transmits a UE's DL TX signal, with the transmit power for each DL TX beam, i, being balanced by the power weighting control circuit 44-45, 46-47 to be proportional to its received power at the UE.

Figure 5:
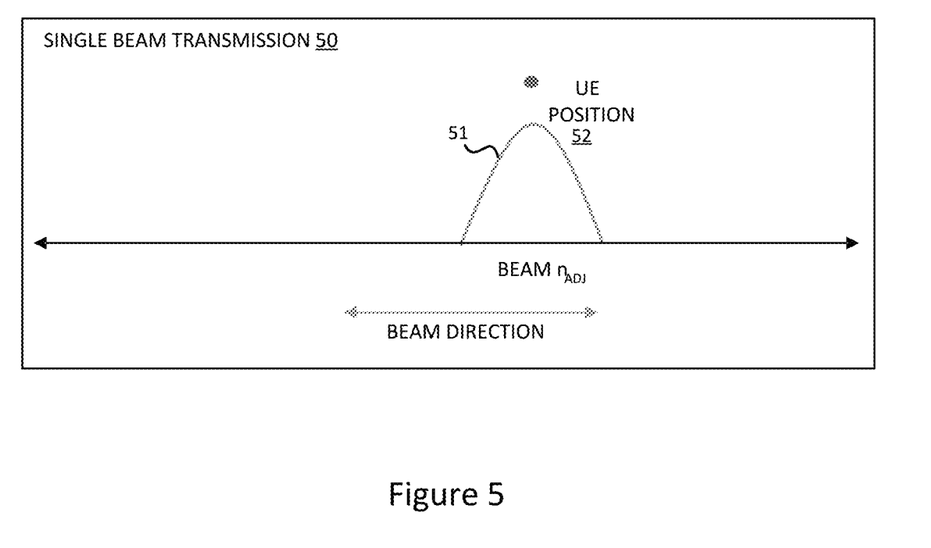
FIG. 5 diagrammatically depicts a single data downlink transmit beam for synchronization of a wireless communication system in accordance with selected embodiments of the present disclosure.
Figure 6:
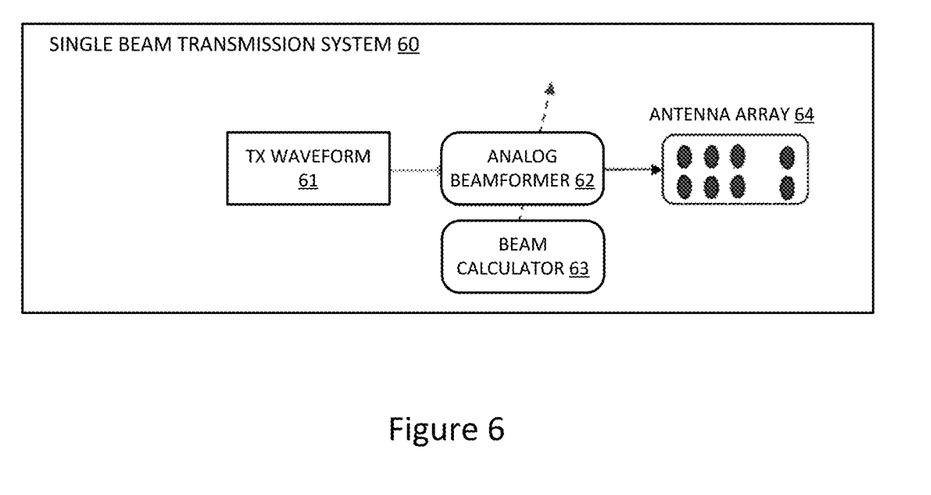
FIG. 6 depicts a wireless communication system which uses a single composite beam transmission system to perform synchronization procedure between a base station (BS) and user equipment (UE) in accordance with selected embodiments of the present disclosure.

Another approach for addressing the limitations from conventional approaches for making initial acquisition is illustrated in FIG. 5 which diagrammatically depicts a single beam transmission scheme 50 for generating a single data downlink transmit beam 51 which is aligned with the UE position 52 for synchronization of a wireless communication system in accordance with selected embodiments of the present disclosure. By transmitting a single adjusted DL TX beam $n_{ADJ}$ 51 which is weighted for optimal alignment with the UE location 52, the signal strength of the resultant beam 51 to the UE position 52 is effectively increased as compared to any of the predefined set of beams (e.g., beams 11-14 in FIG. 1), thereby enhancing link quality. While any suitable single-beam transmission system may be used, reference is now made to FIG. 6 which depicts an example wireless communication system 60 for performing optimal beamformed transmission between a base station (BS) and user equipment (UE) in accordance with selected embodiments of the present disclosure. As disclosed, the wireless communication system 60 is equipped with one or more transmit waveform units 61 (e.g., digital signal processors), an analog beamformer unit 62, and a transmit antenna array 64. In operation, the adjusted DL TX beam 51 (e.g., beam $n_{ADJ}$) is generated by the analog beamformer 62 with weight control inputs from the beam calculator 63 to adjust the beamforming direction of the DL TX beam applied by the transmit antenna array 64. In this configuration, the single beamformer system 60 uses the beam calculator 63 to adjust the weights applied to the beamformer unit 62 as to generate the optimal beamform in the perceived direction of the UE position 52.

Figure 7:
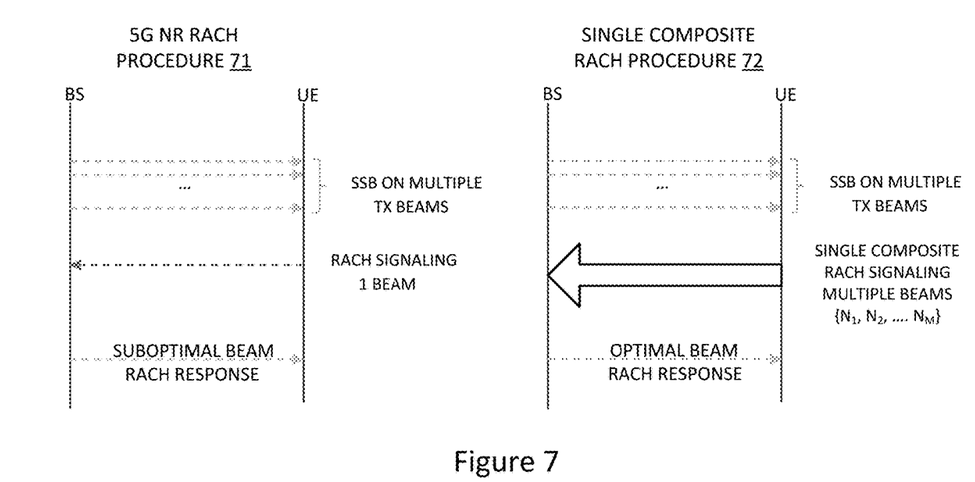
FIG. 7 depicts the random access channel (RACH) synchronization procedures used in a conventional wireless communication system and in a single composition RACH signaling system in accordance with selected embodiments of the present disclosure.

To provide additional details for an improved understanding of selected embodiments of the present disclosure, reference is now made to FIG. 7 which provides a comparison of a conventional RACH synchronization procedure 71 used in a wireless communication system and a single composite RACH synchronization procedure 72 used in accordance with selected embodiments of the present disclosure. In the conventional RACH procedure 71, the base station BS transmits periodic synchronization signal blocks (SSB) on time-multiplexed TX beams (directions) on the downlink (DL), and the UE performs a cell search on multiple DL TX beams to decode broadcast messages from the SSBs to get identifying information of the base station (MIB, SIBS, etc.) along with time and frequency synchronization information for RACH uplink signaling opportunities. The UE then selects one of the DL TX beams as the "best" beam, and the UE and BS then engage in a "random access channel" (RACH) procedure where the UE sends a RACH signaling beam to announces its presence, and in response, the BS synchronizes with the UE by using the selected DL TX beam to send a RACH response to the UE, resulting in a RRC_connected state. As explained hereinabove, the selected beam for the RACH response in the conventional RACH synchronization procedure 71 is suboptimal insofar as the location of the UE may be with the overlap or beam edge zone where any UE is not located in the beam center but is instead on the "beam edge" of (two) DL TX beams.

In contrast, the single composite RACH synchronization procedure 72 also uses the base station's periodic transmission of synchronization signal blocks (SSB) to perform a cell search at the UE on multiple DL TX beams, but instead of selecting one of the existing DL TX beams, the UE decodes broadcast messages from a plurality of "m" SSBs to get identifying information of the "m" favorable DL TX beams (typically, m=2) from the SSB signals transmitted by the base station. The UE then generates one or more RACH preambles (e.g., a single composite RACH preamble) which identify "m" multiple beams (N1, N2, . . . , Nm) as the "best" DL TX beams based on measurements on the SSB transmission on each DL TX beam, and the UE and BS then engage in a "random access channel" (RACH) procedure where the UE sends the one or more RACH preambles for uplink transmission to the BS to announce its presence.

In addition to conveying the "m" favorable DL TX beams, the transmitted UL RACH preamble(s) may also explicitly or implicitly convey the relative weights for each of the "m" beams. In response, the BS synchronizes with the UE by using the information conveyed in the RACH preamble(s) to send a RACH response using an optimal DL TX beam to the UE, subsequently resulting in an RRC_connected state. In selected embodiments, the BS uses a single composite RACH preamble to generate an optimal DL TX beamformer as a custom beam which is designed based on the communicated DL TX beam directions and their relative weights that are signaled by the single composite RACH preamble. In selected embodiments, the BS uses the information conveyed by the UE's single composite RACH preamble to deduce the "m" communicated DL TX beam directions and their weights, and calculates therefrom the optimal beam "direction" as a weighted sum $\theta_{opt} = \Sigma_{k \in S_m} w_k \theta_k$, where $S_m$ is a subset of beam indices signaled in the single composite RACH message, and where $\theta_k$ denotes the angle corresponding to the beam direction of the kth beam, while $w_k$ is a weighting factor chosen to be inversely proportional to the "power" of the RACH received for the $k^{th}$ TX beam. The BS then uses beamforming weights corresponding to $\theta_{opt}$ to transmit to the UE, such as by making a combination of the "m" beams or by transmitting the "m" beams with their respective power levels balanced to be proportional to the respective power levels received at the UE.

Figure 8:
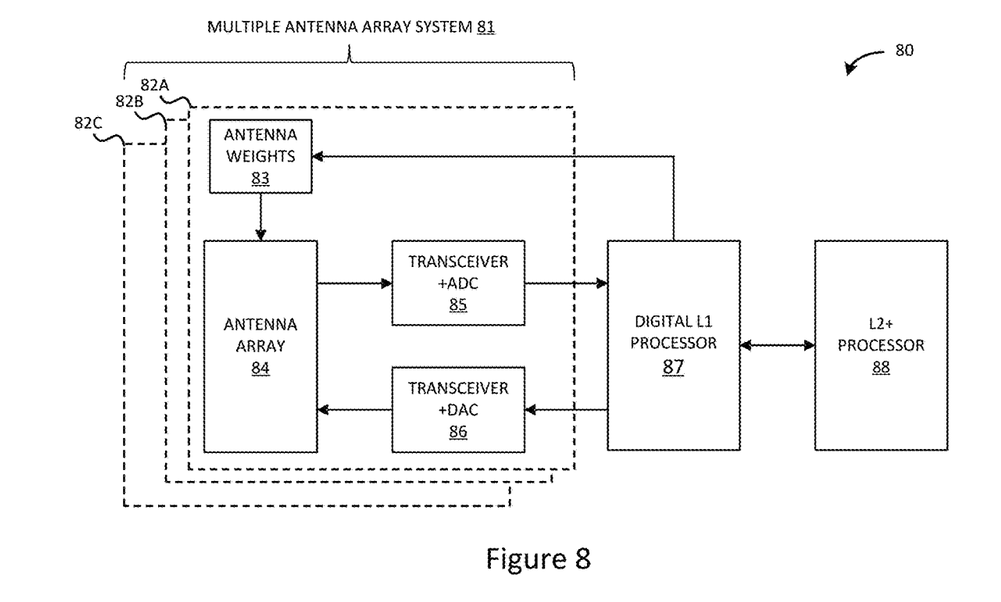
FIG. 8 is a block diagram illustration of a wireless communication system having a multi-antenna millimeter-wave subsystem with analog beamforming for performing cell search using a single composite RACH preamble in accordance with selected embodiments of the present disclosure.

To provide additional details for an improved understanding of selected embodiments of the present disclosure, reference is now made to FIG. 8 which is a simplified block diagram illustration of a wireless communication system 80 having a digital processing subsystem 87, 88 and an analog beamforming multi-antenna millimeter-wave subsystem 81 for performing cell search using a single composite RACH preamble in accordance with selected embodiments of the present disclosure. As illustrated, the wireless communication system 80 can be used to implement a base station or a user equipment device, depending on the programming functionality embodied in the system 80. In any implementation, each multi-antenna array subsystem 82A-C may include a plurality of configurable antenna array elements 84, where each may include a reconfigurable band-pass filter within the feeding line of an antenna element (e.g., filtenna). When receiving or transmitting signals over the multi-antenna array subsystem 81, the analog beamformers may apply analog beamforming weights 83 to the array 84 under control of the digital L1 processor 87 which provides a beam controller functionality. The received beamformed output(s) from the antenna array 84 may be connected to a first transceiver system 85 which may include a millimeter-wave up/down converter and analog-to-digital converter to provide signal processing and conversion to/from baseband via additional filtering stages, up/down conversion stages, ADC/DAC etc.

When embodied as a base station, the digital output from the first transceiver system 85 may include information that is received from a UE during an initial signal acquisition phase and that is conveyed by a single composite RACH preamble from a UE which identifies the UE's "m" most favorable DL TX beams selected from the SSB signals transmitted by the base station along with the relative weights for each of the "m" beams. And when embodied as a user equipment, the digital output from the first transceiver system 85 may include SSB information that is received from the BS over a plurality of acquisition downlink transmit beams. In either case, the digital output from the first transceiver system 85 is streamed to the digital L1 processor subsystem 87 that performs baseband processing commensurate with the physical layer processing requirements of the communication protocol. The L1 processor outputs are subsequently processed by a second processor subsystem 88 that can perform processing commensurate with the requirements for layers 2 and higher as stipulated by the communication standard. It should be appreciated that the L1 processor blocks can be implemented via one or more DSP cores, custom ASICs, or, one or more generic vector processors. Likewise, the L2 and higher layer processors can be implemented via one or more DSP or application processor cores.

Under control of the digital processing subsystem 87, the analog weights 83 are applied to the antenna array 84 to perform analog beamforming on the transmit signal output from the second transceiver system 86 which may include a millimeter-wave up/down converter and digital-to-analog (DAC) converter to provide signal processing and conversion to/from baseband via additional filtering stages, up/down conversion stages, ADC/DAC etc. When embodied as a base station, the digital output from the second transceiver system 86 may include SSB information that transmitted by the BS over a plurality of acquisition downlink transmit beams in a periodically transmitted SSB burst during initial synchronization, and may include a RACH response that is transmitted by the BS over an optimal downlink transmit beam that is designed using the "m" favorable DL TX beams and corresponding weights conveyed by the single composite RACH preamble from the UE. And when embodied as a user equipment, the digital output from the second transceiver system 86 may include the single composite RACH preamble that is transmitted by the UE over a selected RACH uplink transmit beam and that conveys the "m" favorable DL TX beams and corresponding weights identified by the UE. For example, the UE may transmit one RACH preamble in a RACH opportunity corresponding to the "strongest" TX beam identified by the UE.

Figure 9:
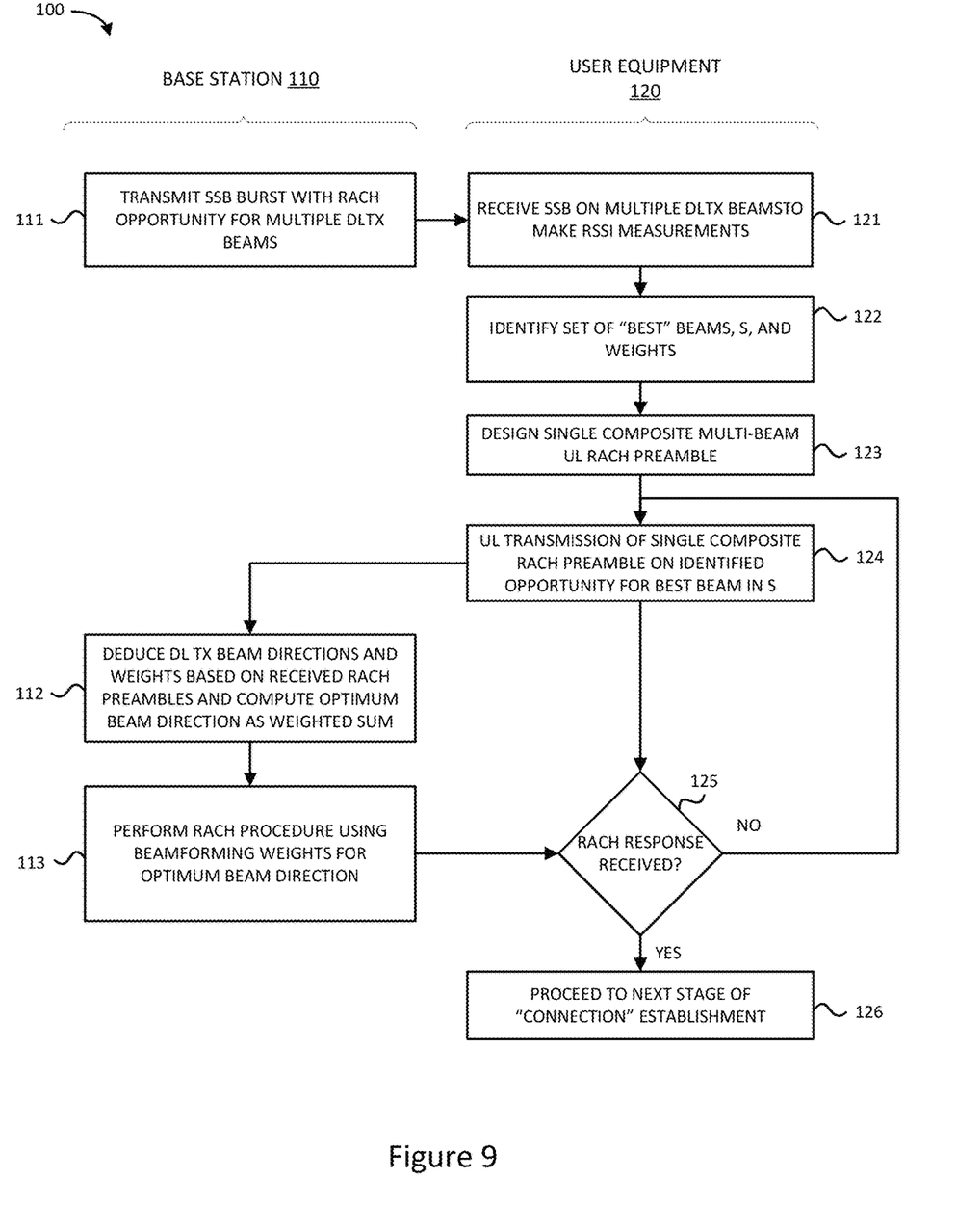
FIG. 9 depicts a simplified flow chart showing the logic for establishing mm-wave initial access between a base station and user equipment in a wireless communication system in accordance with selected embodiments of the present disclosure.

Referring now to FIG. 9, there is depicted an example flow diagram 100 of the logic for establishing mm-wave initial access between a base station and user equipment in accordance with selected embodiments of the present disclosure. In the flow diagram 100, the method steps may be performed by programmable vector processing software, hardware and/or firmware having an vector processing hardware accelerator stages which are controlled by control logic (e.g., at the digital processing subsystem) to identify a plurality of "m" preferred DL TX beams at the UE, construct a single composite RACH preamble (SCRP) at the UE that identifies the "m" preferred DL TX beams and their corresponding weights, send the SCRP over a synchronized uplink to the BS, and then designing an optimal or adjusted DL TX beamformer at the BS for use in sending a RACH response to the UE. The disclosed methods provide a compact, fast, and power efficient mechanism for achieving maximum robustness (coverage) and minimum acquisition times for establishing initial cell acquisition with next-generation mm-wave cellular communication systems, such as 5G-NR. In addition, the disclosed methods provide a compact, fast, and power efficient mechanism for establishing beamforming directions between the UE and the BS during both initial access and beam failure recovery (wherein the UE and BS lose beam tracking and the beam directions have to be rediscovered) using a RACH process.

As a preliminary step, the base station 100 periodically transmits a Synchronization Signal Block (SSB) as part of a first SSB burst (step 111). In an example embodiment, each SSB burst from a base station 110 may include 64 independent SSB transmissions appearing on up to 64 independent transmit TX beams (corresponding to 64 different directions).

At step 121, the user equipment 120 can listen for an SSB transmission on one or more receive RX beams by configuring its antenna array accordingly. In selected embodiments, the UE can listen on one or more receive RX beams for the entirety of the SSB burst, such as by continuously sweeping the receive RX beams during each SSB burst to make specified received signal strength indicator (RSSI) measurements or calculations which provide a measure of the received signal power for each receive DL TX beam. While any suitable power or energy measurement technique may be used to compute RSSI values, the computed RSSI values may be used at step 122 to identify a set "S" of preferred DL TX beams based on one or more predetermined selection criteria (e.g., the beams that have the most power).

At step 123, the set of preferred or "best" beams and their relative weights are used to design a single composite multi-beam UL RACH preamble. In an example implementation, the processing at step 123 may be performed by a digital signal processor which designs the RACH preamble as a linear weighted superposition of sequences with IDs derived from a subset of IDs reserved for "multiple RACH." Each sequence in the superposition may be weighted proportionally to the relative power received for the corresponding DL TX beams in the initial synchronization process using the SSB. By properly choosing the subset of the sequence IDs, there is an implicit mapping from the multiple IDs and the RACH opportunity used (e.g., TX beam index) to a unique UE and to a unique set of "M" strongest beams for that UE. Mathematically, let $x_u(n)$, $n=0, 1, \ldots, N$ denote a RACH preamble sequence corresponding to an integer ID, u. Then the single composite RACH preamble is constructed as $x_{S,u}(n) = S_{u \in S} w_u x_u(n)$, where S is the set of IDs for multi-beam RACH, and $w_u$ is a scaling factor for each sequence. It will be appreciated that any deterministic method may be used to calculate the weighting factors such that the BS is able to map the measured weighting factors to relative powers for the M signaled beams.

In accordance with selected embodiments of the present disclosure, a single composite RACH preamble may be designed by defining sets of RACH sequence IDs so that their mapping and selection satisfies the principle that, upon reception by the base station of a RACH preamble (within a RACH opportunity mapping to a SSB beam index, j) that contains a linear superposition of message sequences with IDs belonging to the set, $\tilde{S}$, the base station may, upon identifying any ID within this set, ascertain all IDs contained in $\tilde{S}$ and may also determine a unique TX beam index for each ID contained in $\tilde{S}$. Mathematically, this is defined as follows:

Given set S of all possible IDs available for RACH contention, and, a total of M beams, the UE selects for its m-sequence SCRP transmission a RACH opportunity corresponding to TX beam index, j, and, the set of IDs $\{n_1, n_2, \ldots, n_m\}$, such that $\{n_1, n_2, \ldots, n_m\} \subset \tilde{S}$, where $\tilde{S} \subset S$, and there exist functions $f(.)$ and $g(.)$ such that $$\forall n \in \{n_1, n_2, \ldots, \}, f: n \to \tilde{S}$$

$$g: \{\{n_1, n_2, \ldots, n_m\}, j\} \to \{l_1, l_2, \ldots, l_m\},$$

where, $l_p \neq l_q$ for $p \neq q$, and, $l_p \Leftrightarrow n_p$, and, $l_p \in J$, for $\forall p \in \{1, 2, \ldots, m\}$, where J is the set of all possible TX beam indices for SSB transmissions, and where $f$ and $g$ could be either definitive, or, measurement based SCRP schemes would typically require a larger space of RACH sequence IDs to maintain the same levels of collision probabilities as the current 5G-NR standard. However, since the search spaces expansions are designed to be fairly orthogonal in the "beam" dimension, the additional BS complexity required to support these expanded ID spaces is minimal.

First Enabling Description of Single Composite RACH Preamble

To provide additional details for an improved understanding of how to design a single-composite RACH preamble for uplink transmission by the UE, a first enablement example is described that satisfies the requirements for designing a multiple-sequence composite RACH preamble. In the example, each unique RACH sequence is denoted by an integer identifier, and the set $S_{RACH}$ is defined as the set of all available RACH sequence IDs. In order to partition the set $S_{RACH} = S_{R,1} \cup S_{R,2} \cup \ldots S_{R,M}$, the following properties hold for the partitioning:

For $p, q \in \{1, 2, \ldots, M\}$, M is the maximum number of beams allowed to be signaled per UE.

$|S_{R,p}| = K$, where K is an integer representing the space of random RACH selections available to each UE.

Each set $S_{R,p}$ is ordered, that is, an index k ($1 \leq k \leq K$) uniquely identifies an element in each $S_{R,p}$.

$S_{R,p} \cap S_{R,q} = \emptyset$, when $p \neq q$ (This condition may be relaxed so as to make the intersection space >0, but still small).

Let TX beam, with index $j \in J$, be the strongest TX beam seen by the UE (the SCRP is sent on the RACH opportunity corresponding to j). Then, the UE RACH sequence selection is as follows:

UE selects a random index k, such that $1 \leq k \leq K$,

UE selects $k^{th}$ element of $S_{R,m}$ to signal the strongest beam, where $m=M/2$, for even M and $m=\lceil M/2 \rceil$, for odd M, UE selects $k^{th}$ element of $S_{R,m-1}$ to signal the second strongest beam that occurred before SSB for j (within a SSB burst), UE selects $k^{th}$ element of $S_{R,m+1}$ to signal the second strongest beam that occurred after SSB for j (within a SSB burst), UE selects $k^{th}$ element of $S_{R,m-2}$ to signal the third strongest beam that occurred before SSB for j (within a SSB burst), UE selects $k^{th}$ element of $S_{R,m+2}$ to signal the third strongest beam that occurred after SSB for j (within a SSB burst), And so on until a maximum of M beams have been identified.

If m±j is less than 1 or greater than M, modulus with respect to M is used.

In this embodiment, the RACH preamble is generated as a linear weighted superposition of sequences identified above. Each sequence in the superposition is weighted proportional to the relative power or energy or some such metric received for the corresponding DL TX beams in the initial synchronization process using the SSB.

Second Enabling Description of Single Composite RACH Preamble

To provide additional details for an improved understanding of how to design a single-composite RACH preamble for uplink transmission by the UE, a second enablement example is described that satisfies the requirements for designing a multiple-sequence composite RACH preamble. In the example, each unique RACH sequence is denoted by an integer identifier, and the set $S_{RACH}$ is defined as the ordered set of all available RACH sequence IDs, with L entries, that is, an index l (1≤l≤L) uniquely identifies each element in $S_{RACH}$. Then, using $n_l$ to denote the $l^{th}$ element of $S_{RACH}$, there is defined a root sequence, $$S_R = \left\{ n_l \in S_{RACH} : l = kM_s + \left\lfloor \frac{M_S}{2} \right\rfloor + 1, \text{ for } k = 0, 1, \ldots, \right.$$

such that l≤L}, where 1≤$M_S$≤M.

In order to send a SCRP mode RACH preamble, the UE selects a random element from the set $S_R$ (e.g., $n_l$), and then lets the TX beam, with index j∈J, be the strongest TX beam seen by the UE (the SCRP is sent on the RACH opportunity corresponding to j). Then, the UE RACH sequence selection is as follows:

UE uses $n_l$ to signal the strongest beam.
UE uses $n_{l-1}$ to signal the second strongest beam that occurred before SSB for j (within a SSB burst).
UE uses $n_{l+1}$ to signal the second strongest beam that occurred after SSB for j (within a SSB burst).
UE uses $n_{l-2}$ to signal the third strongest beam that occurred before SSB for j (within a SSB burst).
UE uses $n_{l+2}$ to signal the third strongest beam that occurred after SSB for j (within a SSB burst).
And so on until a maximum of M beams have been identified.

If l±j maps to an index that is beyond $S_R$, then the indices are wrapped around circularly.

The parameter $M_S$ can be chosen to tradeoff complexity with collision probabilities.

In this embodiment, the RACH preamble is generated as a linear weighted superposition of sequences, where each sequence in the superposition is weighted proportionally to the relative power or energy or some such metric received for the corresponding DL TX beams in the initial synchronization process using the SSB.

At step 124, the single composite RACH preamble (SCRP) is transmitted by the UE on the uplink at the identified opportunity for the best beam in the set "S" of preferred DL TX beams. In this way, the UE 120 announces its presence over a synchronized uplink message to the BS 110.

At step 112, the base station 110 processes the received SCRP to deduce the "m" best downlink transmit beam directions and weights, and compute therefrom the optimum beam direction as a weighted sum for sending the RACH response to the UE 120. In order to differentiate SCRPs from different UEs, the base station 110 may also process the received SCRP to assign a sequence identifier to the UE 120 and associated downlink transmit beam. In selected embodiments, the base station 110 may be configured to detect each "sequence ID" by correlation when the sequences are designed to be near orthogonal for different IDs. For example, at each UL RACH opportunity, the base station 110 searches over the subset of IDs reserved to signal the dominant beam, and, on discovery of an ID within this space, searches for the secondary ones in a hierarchical order. Upon detecting a single composite RACH preamble, the base station 110 can determine the "m" best beams for the UE based on the IDs and the implicit mapping, along with the corresponding "m" weighting factors based on the relative powers of the "m" sequences. With this information, the base station 110 can calculate the optimal beamformer weights for the UE 120.

At step 113, the base station 110 may use the optimal beamformer weights to perform the next steps in the RACH procedure. For example, the base station 110 can start using the computed "optimal beam" to send a RACH response to exchange one or more DL and UL messages on the identified beam as part of the process of establishing a connected state between the base station 110 and user equipment 120.

At step 125, the user equipment 120 determines if a RACH response is received. If not (negative outcome to step 125), the process returns to step 124. However, when a RACH response is received (affirmative outcome to step 125), then the process proceeds to the next stage of establishing a connection for data transmission at step 126. In this connected state, the UE can (re)initiate the RACH process (which starts with sending the RACH preamble by the UE) when the UE loses track of the beams coming from the base station by re-transmitting the single composite RACH preamble (step 124) as part of a post-connected process. As will be appreciated, the optimal beamformer may be used for the RACH response and multiple subsequent DL transmissions to the UE. Further, this design/direction can also be used to configure the optimal receive beamformer at the BS while receiving UL transmissions from the UE due to the symmetry of the mm-wave channels. Thus, the random access preamble-based RACH procedure may be used in the initial cell acquisition process or the post-connected process.

Figure 10A:
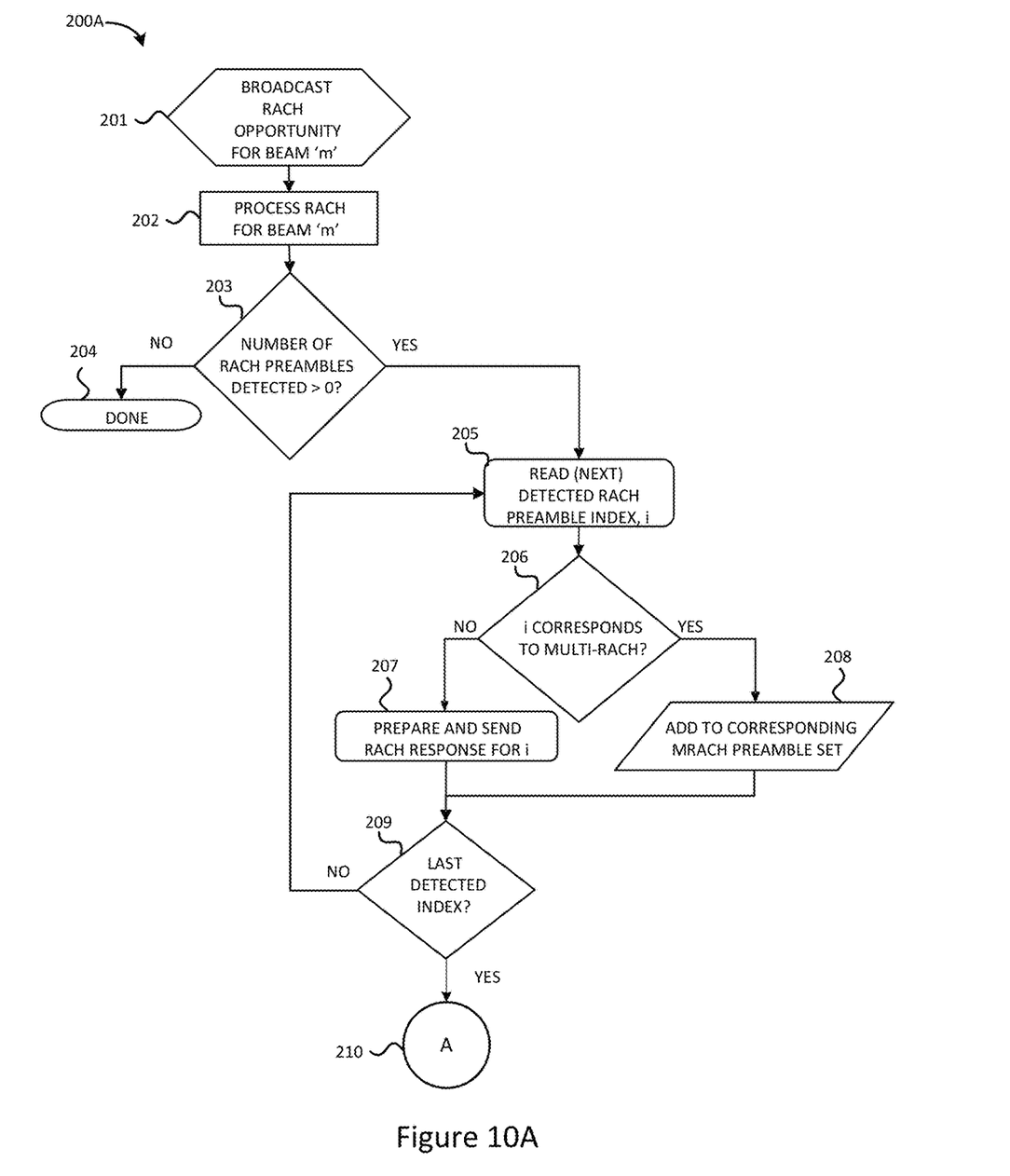
FIGS. 10A-B depict a simplified flow chart showing the logic for establishing mm-wave initial access at a base station in accordance with selected embodiments of the present disclosure.
Figure 10B:
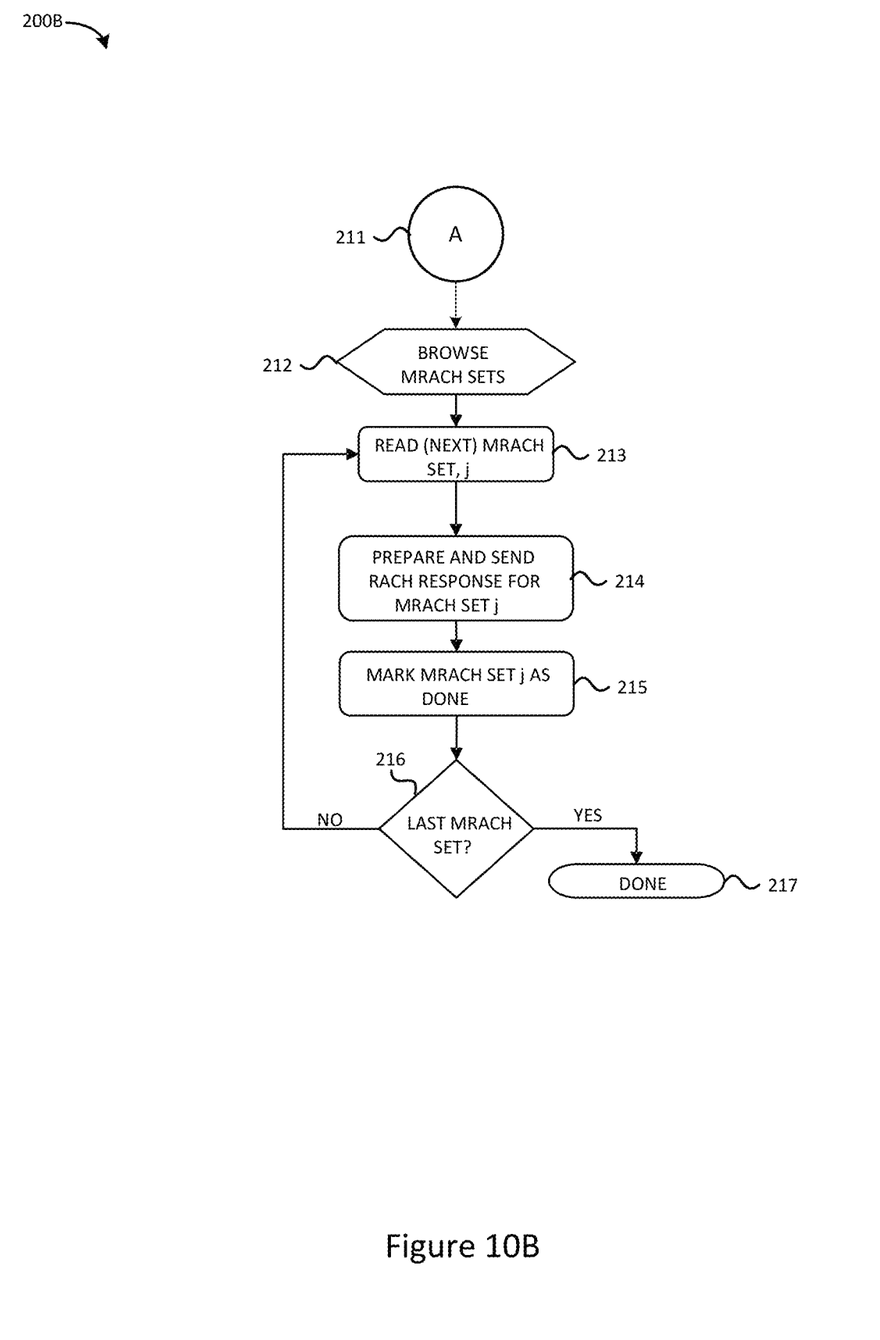

Referring now to FIGS. 10A-B, there is depicted an example flow diagram 200A-B of the logic for establishing mm-wave initial access at a base station in accordance with selected embodiments of the present disclosure. In the flow diagram 200, the method steps may be performed by programmable vector processing software, hardware and/or firmware having an vector processing hardware accelerator stages which are controlled by control logic (e.g., at the digital processing subsystem) to enable the base station to process a received single composite RACH preamble (SCRP) from a UE to identify the "m" preferred DL TX beams and their corresponding weights, and to determine the "best" DL beam/direction for use in sending a RACH response to the UE. The disclosed methods provide a compact, fast, and power efficient mechanism for achieving maximum robustness (coverage) and minimum acquisition times for establishing initial cell acquisition with next-generation mm-wave cellular communication systems, such as 5G-NR.

As a preliminary step illustrated in the flow diagram 200A of FIG. 10A, the base station broadcasts RACH opportunities for uplink communications via a plurality of beams, including a RACH opportunity for beam "m." In an example embodiment, the base station periodically transmits a Synchronization Signal Block (SSB) as part of a first SSB burst which includes 64 independent SSB transmissions appearing on up to 64 independent transmit TX beams (corresponding to 64 different directions). An information block is also broadcasted per direction that provides a specified time and frequency for the RACH opportunity to respond using the beamformer direction associated with the SSB.

At step 202, the base station processes RACH responses for each beam "m" by listening at the specified RACH opportunities for any RACH preambles sent from a UE. In selected embodiments, the BS monitors the specified time and frequencies for RACH uplink opportunities to detect RACH preambles for each beam. If there are no RACH preambles detected (negative outcome to detection step 203), then the process is done (step 204). However, if there is at least one RACH preamble detected (affirmative outcome to detection step 203), then the process parses through the list of all detected RACH preamble indices, starting by processing the next index from the list, i, at step 205.

At step 206, the base station determines if the current RACH preamble index corresponds to or otherwise implies a specified "multiple RACH" index. If not (negative outcome to detection step 206), this indicates that a composite RACH preamble was not detected, and the base station proceeds with normal (conventional) operation by preparing and sending a RACH response for the RACH preamble i (step 207). However, if RACH preamble index i corresponds to a multi-RACH (affirmative outcome to detection step 206), this indicates that a composite RACH preamble was detected, and the base station adds the RACH preamble to the corresponding MRACH preamble set (step 208) for subsequent processing in steps 212-216 described more fully hereinbelow.

At step 209, the base station detects whether the last preamble index from the list has been parsed. If not (negative outcome to detection step 209), the base station reads the next detected RACH preamble index i (step 205) from the list for processing to determine if it is a conventional or a composite RACH (steps 206-208). However, if the last RACH preamble index i was detected (affirmative outcome to detection step 209), then the process proceeds through step 210 to the MRACH processing steps 211-216 illustrated in the flow diagram 200B of FIG. 10B.

As a preliminary step 212 in the MRACH process, the base station browses the MRACH sets to select a first MRACH set, j. At step 213, the base station reads the MRACH set j, and then prepares a RACH response for MRACH set j to be sent to the appropriate UE (step 214). As disclosed herein, the base station's RACH response is sent using an optimal or adjusted beamformer that is centered to the detected location of the UE based on a plurality of communicated DL TX beam directions and corresponding weights conveyed with the UE's received single composite RACH preamble. As disclosed herein, the base station uses the beamforming weights corresponding to a computed optimal beam "direction" $\theta_{opt}$ derived from the SCRP to transmit to the UE with either a single-beam or multi-beam DL transmission system. Upon transmission of a RACH response, the corresponding MRACH set j is marked as complete or done (step 215), and the base station then determines if the last MRACH set has been processed (step 216). If not (negative outcome to detection step 216), then the processing steps 213-215 are repeated for the next MRACH set (e.g., j=j+1). However, if the last MRACH set has been processed (affirmative outcome to detection step 216), then the base station's MRACH processing is done (step 217).

By now it should be appreciated that there has been provided an apparatus, method, program code, and system for making initial access between a user equipment (UE) device and a base station in a multi-antenna system, such as a next generation 5G millimeter-wave wireless system. In the disclosed embodiments, the UE then identifies a plurality of m strongest transmit beams from the base station and generates a composite uplink random access channel (RACH) preamble to identify the plurality of m strongest transmit beams. When identifying m strongest transmit beams, the UE may measure power levels for each of a plurality of transmit beams transmitted by the base station. In addition, the UE generates the composite uplink RACH preamble as a linear weighted superposition of sequences based on IDs derived from a subset of multiple RACH IDs such that each sequence in the superposition is weighted proportionally to a relative power of the corresponding plurality of transmit beams. In selected embodiments, the subset of multiple RACH IDs may be designed by defining sets of RACH sequence IDs so that their mapping and selection satisfies a condition that, upon reception by the base station of the single composite RACH preamble that contains a linear superposition of message sequences with IDs belonging to the subset, the base station may, upon identifying any ID within the subset, ascertain all IDs contained in the subset and may also determine a unique TX beam index for each ID contained in the subset. Subsequently, the UE sends the composite uplink RACH preamble to the base station, such as by transmitting the composite uplink RACH preamble to the base station on a specified RACH uplink opportunity identified in a synchronization signal block (SSB) transmitted on a transmit beam having a strongest power measurement. Subsequently, the UE receives a RACH response on an optimal downlink transmit beam generated by the base station using the plurality of m strongest transmit beams and relative weights identified in the composite uplink RACH preamble. In some embodiments, the RACH response is received at the UE by receiving the RACH response which is transmitted by the base station on the plurality of m strongest transmit beams, each having a transmit power which is weighted by the relative weights identified in the composite uplink RACH preamble to form the optimal downlink transmit beam. In other embodiments, the RACH response is received at the UE by receiving the RACH response which is transmitted by the base station on the optimal downlink transmit beam which is generated by adjusting and combining the plurality of m strongest transmit beams based on relative weights identified in the composite uplink RACH preamble. In addition, the UE exchanges one or more subsequent downlink messages with the base station on the optimal downlink transmit beam to establish a connection.

In another form, there is provided a base station and associate method of operation for making initial access with a user equipment device in a millimeter-wave multiple antenna system. The base station includes a multiple antenna subsystem and beamformer subsystem connected to and configured by a digital controller to wirelessly make initial access with the user equipment device. In the disclosed methodology, the base station transmits a plurality of synchronization signal blocks (SSB) on a corresponding plurality of transmit beams, such as are used with a millimeter wave radio access technology (mmW RAT) system. Subsequently, the base station receives a composite random access channel (RACH) preamble from a first user equipment device which identifies a plurality of m strongest transmit beams identified by the first user equipment device. In selected embodiments, the composite RACH preamble is received on a specified RACH uplink opportunity identified in a synchronization signal block (SSB) transmitted on a transmit beam having a strongest received power measure at the first user equipment device. In response to receiving the composition RACH preamble, the base station may generate an optimal downlink transmit beam which is directionally aligned with the first user equipment device based on the plurality of m strongest transmit beams and relative weights identified in the composite RACH preamble. In selected embodiments, the optimal downlink transmit beam is generated at the base station by extracting a linear weighted superposition of sequences from the composite RACH preamble to identify the plurality of m strongest transmit beams and relative weights. In other embodiments, the base station may generate the optimal downlink transmit beam by using the plurality of m strongest transmit beams and relative weights identified in the composite uplink RACH preamble to set a transmit power level for each of the m strongest transmit beams that are balanced to be proportional to a corresponding received power measure at the first user equipment device, thereby forming a plurality of optimal downlink beams that collectively are directionally aligned with the first user equipment device. By sending the downlink RACH response on each of the m strongest transmit beams, a single optimal downlink RACH response is effectively sent. In yet other embodiments, the optimal downlink transmit beam is generated by using the plurality of m strongest transmit beams and relative weights identified in the composite uplink RACH preamble to adjust one or more of a set of beamformer weights to form a single optimal downlink beam that is directionally aligned with the first user equipment device so that the downlink RACH response can be sent on the single optimal downlink beam. Once the optimal downlink transmit beam is generated, the base station sends a downlink RACH response to the first user equipment device using the optimal downlink transmit beam.

In yet another form, there is provided a wireless communication device, method, program code, and system for making initial access with a wireless access node and wireless device in a multiple antenna wireless communication system, such as a next generation 5G millimeter-wave wireless system. In the disclosed embodiments, the wireless communication system includes a wireless access node (AN) having a first multiple antenna subsystem and first beamformer subsystem connected to and configured by a first digital controller to wirelessly make initial access by transmitting a plurality of synchronization signal blocks (SSB) on a corresponding plurality of transmit beams. In addition, the wireless communication system includes a wireless device (WD) having a second multiple antenna subsystem and second beamformer subsystem connected to and configured by a second digital controller to wirelessly make initial access by identifying a plurality of m strongest transmit beams from the AN, generating a composite random access channel (RACH) preamble to identify the plurality of m strongest transmit beams, and sending the composite RACH preamble to the wireless AN. In selected embodiments, the WD is configured to design the composite RACH preamble as a linear weighted superposition of sequences with IDs derived from a subset of multiple RACH IDs such that each sequence in the superposition being weighted proportionally to a relative power received for the m strongest transmit beams. In response to the composite RACH preamble, the wireless AN may be configured to send a RACH response on an optimal downlink transmit beam which is directionally aligned with the WD based on the plurality of m strongest transmit beams and relative weights identified in the composite RACH preamble. In selected embodiments, the AN is configured to generate the optimal downlink transmit beam by extracting the linear weighted superposition of sequences from the composite RACH preamble to identify the plurality of m strongest transmit beams and relative weights.

In still yet another form, there is provided an apparatus, method, program code, and system for establishing beamforming direction between a user equipment (UE) device and a base station (BS) in a multi-antenna system, such as a next generation 5G millimeter-wave wireless system. In the disclosed embodiments, the UE identifies a plurality of m strongest transmit beams from the base station. In addition, the UE generates n random access channel (RACH) preambles to identify the plurality of m strongest transmit beams received at the user equipment device, where the n<m. In selected embodiments, the UE generates n RACH preambles by generating a single composite RACH preamble to identify the plurality of m strongest transmit beams received at the user equipment device. In addition, the UE sends the n RACH preambles to the base station. In addition, the UE may receive one or more downlink transmissions at the user equipment device on an optimal downlink transmit beam generated by the base station using the plurality of m strongest transmit beams identified in the n RACH preambles. In other embodiments, at least one of the n RACH preambles corresponds to more than one of the strongest beams received at the user equipment device.

The disclosed apparatus, methods and systems for using a single composite random-access channel (RACH) preamble that signals the UE location so that the base station can accurately calculate the optimal or adjusted transmit beam during the initial access phase for completing cell acquisition in a 5G and millimeter-wave wireless communication system as shown and described herein may be implemented in whole or in part with software stored on a computer-readable medium and executed as a computer program on a general purpose or special purpose computer to perform certain tasks. For a hardware implementation, the elements used to perform various signal processing steps at the user equipment (e.g., receiving SSBs, designing single composite RACH preamble (SCRP) to identify a plurality of "m" best SSB transmissions, sending the SCRP over a specified RACH opportunity uplink transmission, and so on) and/or at the base station (e.g., periodically transmitting SSB bursts over specified downlink transmit beams, detecting one or more SCRP uplink transmissions from UEs, designing and using an optimal or adjusted beamformer that is centered to the detected location of the UE based on a plurality of communicated DL TX beam directions and corresponding weights conveyed with the UE's SCRP, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the base station and user equipment device (s) may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein focus on 5G and mm-wave systems and methods for using same, the present invention is not necessarily limited to the example embodiments illustrate herein and may be applied to any wireless system that uses beamforming to extend signal range, coverage and/or throughput. For example, various embodiments of an initial cell search system and design methodology disclosed herein may be implemented in connection with various proprietary or wireless communication standards, such as IEEE 802.16e, 3GPP-LTE, 4GPP-LTE, 5GPP-LTE, DVB and other multi-user MIMO systems. In addition, the embodiments described herein with reference to using SSB bursts from the base station to determine the favorable transmit beam directions is understood in the context of next-generation wireless 5G-NR wireless network technologies, but it will be appreciated that the present disclosure may be used with other scenarios where the UE is able to find favorable beams and then goes into a RACH procedure using a single composite RACH preamble. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed at a user equipment device with a base station in a multiple antenna system, comprising:
    identifying a plurality of m strongest transmit beams from the base station;
    generating a composite uplink random access channel (RACH) preamble to identify the plurality of m strongest transmit beams; and
    sending the composite uplink RACH preamble to the base station, where the composite uplink RACH preamble is sent as a single uplink message to identify the plurality of m strongest transmit beams.

2. The method of claim 1, where the multiple antenna system comprises a millimeter-wave wireless system.

3. The method of claim 1, further comprising exchanging one or more subsequent downlink messages between the user equipment device and base station on the optimal downlink transmit beam to establish a connection.

4. The method of claim 1, further comprising measuring power levels for each of a plurality of transmit beams transmitted by the base station when identifying the plurality of m strongest transmit beams.

5. The method of claim 1, where generating the composite uplink RACH preamble comprises generating a linear weighted superposition of sequences based on IDs derived from a subset of multiple RACH IDs such that each sequence in the superposition is weighted proportionally to a relative power of the corresponding plurality of transmit beams.

6. The method of claim 1, where sending the composite uplink RACH preamble to the base station comprises transmitting the composite uplink RACH preamble to the base station on a specified RACH uplink opportunity identified in a synchronization signal block (SSB) transmitted on a transmit beam having a strongest power measurement.

7. The method of claim 1, further comprising receiving a RACH response on an optimal downlink transmit beam generated by the base station using the plurality of m strongest transmit beams and relative weights identified in the composite uplink RACH preamble.

8. The method of claim 5, where the subset of multiple RACH IDs is designed by defining sets of RACH sequence IDs so that their mapping and selection satisfies a condition that, upon reception by the base station of the single composite RACH preamble that contains a linear superposition of message sequences with IDs belonging to the subset, the base station will ascertain, upon identifying any ID within the subset, all IDs contained in the subset and determine a unique TX beam index for each ID contained in the subset.

9. A method performed at a base station with a first user equipment device in a multiple antenna system, comprising:
    generating an optimal downlink transmit beam for the first user equipment device based on a plurality of m strongest transmit beams and relative weights identified in a composite RACH preamble received from the first user equipment device; and
    sending a downlink transmission to the first user equipment device using the optimal downlink transmit beam.

10. The method of claim 9, where the base station generates the optimal downlink transmit beam by adjusting and combining the plurality of m strongest transmit beams based on relative weights identified in the composite RACH preamble.

11. The method of claim 9, where the base station sends the downlink transmission as a RACH response which is transmitted on the plurality of m strongest transmit beams, each having a transmit power which is weighted by the relative weights identified in the composite RACH preamble to form the optimal downlink transmit beam.

12. The method of claim 9, where generating the optimal downlink transmit beam comprises extracting a linear weighted superposition of sequences from the composite RACH preamble to identify the plurality of m strongest transmit beams and relative weights.

13. The method of claim 9, where generating the optimal downlink transmit beam comprises using the plurality of m strongest transmit beams and relative weights identified in the composite uplink RACH preamble to set a transmit power level for each of the m strongest transmit beams that are balanced to be proportional to a corresponding received power measure at the first user equipment device, thereby forming a plurality of optimal downlink beams that collectively are directionally aligned with the first user equipment device.

14. The method of claim 13, where sending the downlink transmission comprises sending a downlink RACH response on each of the m strongest transmit beams.

15. The method of claim 9, where generating the optimal downlink transmit beam comprises using the plurality of m strongest transmit beams and relative weights identified in the composite uplink RACH preamble to adjust one or more of a set of beamformer weights to form a single optimal downlink beam that is directionally aligned with the first user equipment device.

16. The method of claim 15, where sending the downlink transmission comprises sending a downlink RACH response on the single optimal downlink beam.

17. A wireless communication system comprising:
a wireless access node (AN) comprising a first multiple antenna subsystem and first beamformer subsystem connected to and configured by a first digital controller to wirelessly make initial access by transmitting a plurality of synchronization signal blocks (SSB) on a corresponding plurality of transmit beams; and
a wireless device (WD) comprising a second multiple antenna subsystem and second beamformer subsystem connected to and configured by a second digital controller to wirelessly make initial access by identifying a plurality of m strongest transmit beams from the AN, generating a composite random access channel (RACH) preamble to identify the plurality of m strongest transmit beams from the wireless AN, and transmitting the composite RACH preamble to the wireless AN, where the composite RACH preamble is sent as a single uplink message to identify the plurality of m strongest transmit beams;
where the wireless AN is configured to send a RACH response on AN optimal downlink transmit beam which is directionally aligned with the WD based on the plurality of m strongest transmit beams and relative weights identified in the composite RACH preamble.

18. The wireless communication system of claim 17, where the WD is configured to design the composite RACH preamble as a linear weighted superposition of sequences with IDs derived from a subset of multiple RACH IDs such that each sequence in the superposition being weighted proportionally to a relative power received for the m strongest transmit beams.

19. The wireless communication system of claim 18, where the AN is configured to generate the optimal downlink transmit beam by extracting the linear weighted superposition of sequences from the composite RACH preamble to identify the plurality of m strongest transmit beams and relative weights.

20. A method performed at a user equipment device to establish beamforming direction with a base station in a multiple antenna system, comprising:
identifying a plurality of m strongest transmit beams from the base station;
generating a single composite RACH preamble to identify the plurality of m strongest transmit beams received at the user equipment device; and
transmitting the single composite RACH preamble to the base station, where the single composite uplink RACH preamble is sent as a single uplink message to identify the plurality of m strongest transmit beams.

21. The method of claim 20, where generating the single composite RACH preamble comprises generating a linear weighted superposition of sequences based on IDs derived from a subset of multiple RACH IDs such that each sequence in the superposition is weighted proportionally to a relative power of the corresponding plurality of transmit beams, where the subset of multiple RACH IDs is designed by defining sets of RACH sequence IDs so that their mapping and selection satisfies a condition that, upon reception by the base station of the single composite RACH preamble that contains a linear superposition of message sequences with IDs belonging to the subset, the base station will ascertain, upon identifying any ID within the subset, all IDs contained in the subset and determine a unique TX beam index for each ID contained in the subset.

22. The method of claim 20, further comprising receiving one or more downlink transmissions at the user equipment device on an optimal downlink transmit beam generated by the base station using the plurality of m strongest transmit beams identified in the single composite RACH preamble.

* * * * *